United States Patent
Subramaniyam

(10) Patent No.: US 9,777,230 B2
(45) Date of Patent: Oct. 3, 2017

(54) EFFECTIVE NOVEL NON-POLYMERIC AND NON-FOULING ADDITIVE FOR INHIBITING HIGH-TEMPERATURE NAPHTHENIC ACID CORROSION AND METHOD OF USING THE SAME

(71) Applicant: Dorf Ketal Chemicals (India) Private Limited, Mumbai (IN)

(72) Inventor: Mahesh Subramaniyam, Mumbai (IN)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 0 days.

(21) Appl. No.: 15/244,688

(22) Filed: Aug. 23, 2016

(65) Prior Publication Data

US 2016/0362619 A1     Dec. 15, 2016

Related U.S. Application Data

(62) Division of application No. 13/264,695, filed as application No. PCT/IB2010/051636 on Apr. 15, 2010, now abandoned.

(30) Foreign Application Priority Data

Apr. 15, 2009  (IN) .......................... 974/MUM/2009

(51) Int. Cl.
   *C09K 8/524*   (2006.01)
   *C09K 8/54*    (2006.01)
   (Continued)

(52) U.S. Cl.
   CPC .............. *C10G 75/02* (2013.01); *B01D 3/34* (2013.01); *C09K 8/524* (2013.01); *C09K 8/54* (2013.01);
   (Continued)

(58) Field of Classification Search
   CPC ........ C02F 2303/08; C09K 8/524; C09K 8/54
   See application file for complete search history.

(56) References Cited

U.S. PATENT DOCUMENTS

| 870,937 A | 11/1907 | Coslett |
| 1,872,091 A | 8/1932 | Mougey |

(Continued)

FOREIGN PATENT DOCUMENTS

| WO | 2006025912 A2 | 3/2006 |
| WO | 2008120236 A2 | 10/2008 |
| WO | 2010119417 A1 | 10/2010 |

OTHER PUBLICATIONS

Certified Indian patent application No. 974/MUM/2009 filed on Apr. 15, 2009, 27 pages.

(Continued)

*Primary Examiner* — Joseph D Anthony
(74) *Attorney, Agent, or Firm* — Conley Rose, P.C.; Rodney B. Carroll

(57) ABSTRACT

The present invention relates to inhibition of high temperature naphthenic acid corrosion occurring in hydrocarbon processing units. The invention provides an effective novel non-polymeric and non-fouling additive for inhibiting high-temperature naphthenic acid corrosion, comprising an effective corrosion-inhibiting amount of a second phosphate ester wherein said second phosphate ester is obtained by reacting a first phosphate ester with an oxirane compound selected from the group consisting of butylene oxide, ethylene oxide, propylene oxide or any other oxirane compound or a combination thereof, preferably with butylene oxide, capably yielding said second phosphate ester, having a structure A or B,

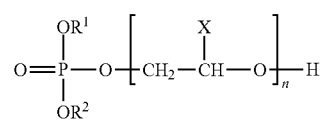

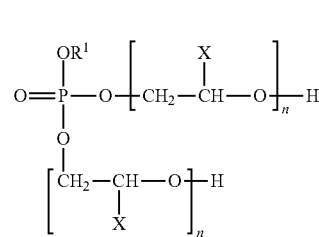

wherein $R^1$ and $R^2$ are each independently selected from the group consisting of moieties having 1 to 20 carbon atoms and $R^1$ and $R^2$ may be identical or different, X is H, $CH_3$ or $C_2H_5$; and n may vary from 1 to 20,
wherein said first phosphate ester is having a structure I or II,

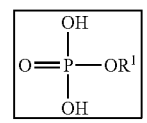

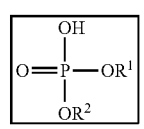

wherein $R^1$ and $R^2$ are each independently selected from the group consisting of moieties having 1 to 20 carbon atoms and $R^1$ and $R^2$ may be identical or different, said first phosphate ester being obtained as a reaction product of reaction of an alcohol with a phosphorous pentaoxide.

9 Claims, No Drawings

(51) Int. Cl.
  *C10G 7/10* (2006.01)
  *C10G 7/04* (2006.01)
  *C10G 75/02* (2006.01)
  *B01D 3/34* (2006.01)
  *C10G 7/00* (2006.01)
  *C23F 11/04* (2006.01)

(52) U.S. Cl.
  CPC ............... *C10G 7/00* (2013.01); *C10G 7/10* (2013.01); *C23F 11/04* (2013.01); *C02F 2303/08* (2013.01); *C10G 2300/1033* (2013.01); *C10G 2300/203* (2013.01); *C10G 2300/4075* (2013.01); *C10G 2300/80* (2013.01)

(56) References Cited

U.S. PATENT DOCUMENTS

| | | | |
|---|---|---|---|
| 3,132,975 A | 5/1964 | Jean Frasch | |
| 3,145,886 A | 8/1964 | Goodwin | |
| 3,407,150 A * | 10/1968 | Foote | C07F 9/091 521/169 |
| 3,460,989 A | 8/1969 | Rusch | |
| 3,531,394 A | 9/1970 | Koszman | |
| 3,909,447 A | 9/1975 | Redmore et al. | |
| 3,959,177 A * | 5/1976 | Martin | C23F 11/10 252/389.2 |
| 4,024,049 A | 5/1977 | Shell et al. | |
| 4,042,323 A * | 8/1977 | Redmore | C02F 5/086 210/699 |
| 4,051,029 A * | 9/1977 | Redmore | C07F 9/3211 210/699 |
| 4,105,540 A | 8/1978 | Weinland | |
| 4,339,349 A * | 7/1982 | Martin | C23F 11/10 422/12 |
| 4,443,609 A | 4/1984 | Oude Alink et al. | |
| 4,542,253 A | 9/1985 | Kaplan et al. | |
| 4,813,482 A * | 3/1989 | Walton | C09K 8/524 166/267 |
| 4,842,716 A | 6/1989 | Kaplan et al. | |
| 4,941,994 A | 7/1990 | Zetlmeisl et al. | |
| 5,182,013 A | 1/1993 | Petersen et al. | |
| 5,252,254 A | 10/1993 | Babaian-Kibala | |
| 5,552,085 A | 9/1996 | Babaian-Kibala | |
| 5,611,991 A * | 3/1997 | Naraghi | C09K 8/54 422/15 |
| 5,611,992 A * | 3/1997 | Naraghi | C09K 8/54 422/15 |
| 5,630,852 A | 5/1997 | Placek | |
| 5,630,964 A | 5/1997 | Babaian-Kibala et al. | |
| 9,434,889 B2 * | 9/2016 | Subramaniyam | C10G 17/02 |
| 2005/0282711 A1 * | 12/2005 | Ubbels | C09K 8/524 507/100 |
| 2005/0282915 A1 * | 12/2005 | Ubbels | C09K 8/524 516/135 |
| 2007/0087944 A1 | 4/2007 | Phillips | |
| 2011/0160405 A1 * | 6/2011 | Subramaniyam | C08F 8/14 525/333.7 |
| 2012/0045361 A1 | 2/2012 | Subramaniyam | |
| 2016/0083315 A1 * | 3/2016 | Subramaniyam | C07B 63/04 585/4 |

OTHER PUBLICATIONS

Foreign communication from a related counterpart application—International Search Report and Written Opinion, PCT/IB2010/051636, Sep. 6, 2010, 8 pages.

Foreign communication from a related counterpart application—International Preliminary Report on Patentability, PCT/IB2010/051636, Jun. 9, 2011, 22 pages.

Office Action (Restriction Requirement) dated Jul. 31, 2014 (7 pages), U.S. Appl. No. 13/264,695, filed Oct. 14, 2011.

Office Action dated Jan. 29, 2015 (13 pages), U.S. Appl. No. 13/264,695, filed Oct. 14, 2011.

Office Action (Final) dated Aug. 12, 2015 (7 pages), U.S. Appl. No. 13/264,695, filed Oct. 14, 2011.

Office Action dated Feb. 24, 2016 (8 pages), U.S. Appl. No. 13/264,695, filed Oct. 14, 2011.

* cited by examiner

EFFECTIVE NOVEL NON-POLYMERIC AND NON-FOULING ADDITIVE FOR INHIBITING HIGH-TEMPERATURE NAPHTHENIC ACID CORROSION AND METHOD OF USING THE SAME

CROSS-REFERENCE TO RELATED APPLICATIONS

This application is a divisional of and claims priority to U.S. patent application Ser. No. 13/264,695 filed on Oct. 14, 2011, published as U.S. Patent Application Publication No. US2012/0045361 A1, which is a filing under 35 U.S.C. 371 of International Application No. PCT/IB2010/051636 filed Apr. 15, 2010 and entitled "An Effective Novel Non-Polymeric and Non-Fouling Additive for Inhibiting High-Temperature Naphthenic Acid Corrosion and Method of Using the Same," claiming priority of Indian Patent Application No. 974/MUM/2009 filed Apr. 15, 2009, which applications are incorporated by reference herein in their entirety.

FIELD OF THE INVENTION

The present invention relates to the inhibition of metal corrosion in acidic hot hydrocarbons and particularly to the inhibition of corrosion of iron-containing metals in hot acidic hydrocarbons, especially when the acidity is derived from the presence of naphthenic acid and more particularly to an effective non-polymeric and non-fouling additive to effect corrosion inhibition and a method of using the same.

BACKGROUND

It is widely known in the art that the processing of crude oil and its various fractions causes damage to piping and other associated equipment due to naphthenic acid corrosion. These are corrosive to the equipment used for distillation, extraction, transportation and processing of the crudes. Generally speaking, naphthenic acid corrosion occurs when the crude being processed has a neutralization number or total acid number (TAN), expressed as the milligrams of potassium hydroxide required to neutralize the acids in one gram sample, above 0.2. It is also known that naphthenic acid-containing hydrocarbon is at a temperature between about 200° C. and 400° C. (approximately 400° F.-750° F.), the fluid velocities are high and liquid impinges on process surfaces e.g. in transfer lines, return bends and restricted flow areas.

Corrosion problems in petroleum refining operations associated with naphthenic acid constituents and sulfur compounds in crude oils have been recognized for many years. Such corrosion is particularly severe in atmospheric and vacuum distillation units at temperatures between 400° F. and 790° F. Other factors that contribute to the corrosivity of crudes containing naphthenic acids include the amount of naphthenic acid present, the concentration of sulfur compounds, the velocity and turbulence of the flow stream in the units, and the location in the unit (e.g., liquid/vapor interface).

As commonly used, naphthenic acid is a collective term for certain organic acids present in various crude oils. Although there may be present minor amounts of other organic acids, it is understood that the majority of the acids in naphthenic based crude are naphthenic in character, i.e., with a saturated ring structure as follows:

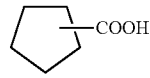

The molecular weight of naphthenic acid can extend over a large range. The majority of the naphthenic acid from crude oils is found in gas oil and light lubricating oil. When hydrocarbons containing such naphthenic acids come in contact with iron-containing metals, especially at elevated temperatures, severe corrosion problems arise.

Naphthenic acid corrosion has plagued the refining industry for many years. This corroding material consists of predominantly monocyclic or bicyclic carboxylic acids with a boiling range between 350° and 650° F. These acids tend to concentrate in the heavier fractions during crude distillation. Thus, locations such as the furnace tubing, transfer lines, fractionating tower internals, feed and reflux sections of columns, heat exchangers, tray bottoms and condensers are primary sites of attack by naphthenic acid. Additionally, when crude stocks high in naphthenic acids are processed, severe corrosion can occur in the carbon steel or ferritic steel furnace tubes and tower bottoms. Recently much interest has grown in the control of this type of corrosion in hydrocarbon processing units due to the presence of naphthenic acid in crudes from locations such as China, India, Africa and Europe.

Crude oils are hydrocarbon mixtures which have a range of molecular structures and consequent range of physical properties. The physical properties of naphthenic acids which may be contained in the hydrocarbon mixtures also vary with the changes in molecular weight, as well as the source of oil containing the acid. Therefore, characterization and behavior of these acids are not well understood. A well known method used to "quantify" the acid concentration in crude oil has been a KOH titration of the oil. The oil is titrated with KOH, a strong base, to an end point which assures that all acids in the sample have been neutralized. The unit of this titration is milligrams of KOH/gram of sample and is referred to as the "Total Acid Number" (TAN) or Neutralization Number. Both terms are used interchangeably in the application.

The unit of TAN is commonly used since it is not possible to calculate the acidity of the oil in terms of moles of acid, or any other of the usual analytical terms for acid content. Refiners have used TAN as a general guideline for predicting naphthenic acid corrosion. For example, many refineries blend their crude to a TAN=0.5 assuming that at these concentrations naphthenic acid corrosion will not occur. However, this measure has been unsuccessful in preventing corrosion by naphthenic acid.

Naphthenic acid corrosion is highly temperature dependent. The generally accepted temperature range for this corrosion is between 205° C. and 400° C. (400° F. and 750° F.). Corrosion attack by these acids below 205° C. has not yet been reported in the published literature. As to the upper boundary, data suggests that corrosion rates reach a maximum at about 600°-700° F. and then begin to diminish.

The concentration and velocity of the acid/oil mixture are also important factors which influence naphthenic acid corrosion. This is evidenced by the appearance of the surfaces affected by naphthenic acid corrosion. The manner of corrosion can be deduced from the patterns and color variations in the corroded surfaces. Under some conditions, the metal surface is uniformly thinned. Thinned areas also occur when condensed acid runs down the wall of a vessel. Alternatively, in the presence of naphthenic acid, pitting occurs often in piping or at welds. Usually the metal outside the pit is covered with a heavy, black sulfide film, while the surface of the pit is bright metal or has only a thin, grey to black film covering it. Moreover, another pattern of corrosion is erosion-corrosion, which has a characteristic pattern of gouges with sharp edges. The surface appears clean, with no visible by-products. The pattern of metal corrosion is indicative of the fluid flow within the system, since increased contact with surfaces allows for a greater amount of corrosion to take place. Therefore, corrosion patterns provide information as to the method of corrosion which has taken place. Also, the more complex the corrosion, i.e., in increasing complexity from uniform to pitting to erosion-corrosion, the lower is the TAN value which triggers the behavior.

The information provided by corrosion patterns indicates whether naphthenic acid is the corroding agent, or rather if the process of corrosion occurs as a result of attack by sulfur. Most crude's contain hydrogen sulfide, and therefore readily form iron sulfide films on carbon steel. In all cases that have been observed in the laboratory or in the field, metal surfaces have been covered with a film of some sort. In the presence of hydrogen sulfide the film formed is invariably iron sulfide, while in the few cases where tests have been run in sulfur free conditions, the metal is covered with iron oxide, as there is always enough water or oxygen present to produce a thin film on the metal coupons.

Tests utilized to determine the extent of corrosion may also serve as indicators of the type of corrosion occurring within a particular hydrocarbon treating unit. Metal coupons can be inserted into the system. As they are corroded, they lose material. This weight loss is recorded in units of mg/cm.sup.2. Thereafter, the corrosion rate can be determined from weight loss measurements. Then the ratio of corrosion rate to corrosion product (mpy/mg/cm.sup.2) is calculated. This is a further indicator of the type of corrosion process which has taken place, for example, if this ratio is less than 10, it has been found that there is little or no contribution of naphthenic acid to the corrosion process. However, if the ratio exceeds 10, then naphthenic acid is a significant contributor to the corrosion process.

Distinguishing between sulfidation attack and corrosion caused by naphthenic acid is important, since different remedies are required depending upon the corroding agent. Usually, retardation of corrosion caused by sulfur compounds at elevated temperatures is effected by increasing the amount of chromium in the alloy which is used in the hydrocarbon treating unit. A range of alloys may be employed, from 1.25% Cr to 12% Cr, or perhaps even higher. Unfortunately, these show little to no resistance to naphthenic acid. To compensate for the corroding effects of sulfur and naphthenic acid, an austenitic stainless steel which contains at least 2.5% molybdenum, must be utilized. The corrosion problem is known to be aggravated by the elevated temperatures, necessary to refine and crack the oil and by the oil's acidity which is caused primarily by high levels of naphthenic acid indigenous to the crudes. Naphthenic acids are corrosive between the ranges of about 175° C. to 420° C. At higher temperatures the naphthenic acids are in the vapor phase and at the lower temperatures the corrosion rate is not serious. The corrosivity of naphthenic acids appears to be exceptionally serious in the presence of sulfide compounds, such as hydrogen sulfide, mercaptans, elemental sulfur, sulfides, disulfides, polysulfides and thiophenols. Corrosion due to sulfur compounds becomes significant at temperatures as low as 450° F. The catalytic generation of hydrogen sulfide by thermal decomposition of mercaptans has been identified as a cause of sulfidic corrosion.

Sulfur in the crudes, which produces hydrogen sulfide at higher temperatures, also aggravates the problem. The temperature range of primary interest for this type of corrosion is in the range of from about 175° C. to about 400° C., especially about 205° C. to about 400° C.

Various approaches to controlling naphthenic acid corrosion have included neutralization and/or removal of naphthenic acids from the crude being processed; blending low acid number oils with corrosive high acid number oils to reduce the overall neutralization number; and the use of relatively expensive corrosion-resistant alloys in the construction of the piping and associated equipment. These attempts are generally disadvantageous in that they require additional processing and/or add substantial costs to treatment of the crude oil. Alternatively, various amine and amide based corrosion inhibitors are commercially available, but these are generally ineffective in the high temperature environment of naphthenic acid corrosion. Naphthenic acid corrosion is readily distinguished from conventional fouling problems such as coking and polymer deposition which can occur in ethylene cracking and other hydrocarbon processing reactions using petroleum based feedstocks. Naphthenic acid corrosion produces a characteristic grooving of the metal in contact with the corrosive stream. In contrast, coke deposits generally have corrosive effects due to carburization, erosion and metal dusting.

Because these approaches have not been entirely satisfactory, the accepted approach in the industry is to construct the distillation unit, or the portions exposed to naphthenic acid/sulfur corrosion, with the resistant metals such as high quality stainless steel or alloys containing higher amounts of chromium and molybdenum. The installation of corrosion-resistant alloys is capital intensive, as alloys such as 304 and 316 stainless steels are several times the cost of carbon steel. However, in units not so constructed there is a need to provide inhibition treatment against this type of corrosion. The prior art corrosion inhibitors for naphthenic acid environments include nitrogen-based filming corrosion inhibitors. However, these corrosion inhibitors are relatively ineffective in the high temperature environment of naphthenic acid oils.

While various corrosion inhibitors are known in various prior arts, the efficacy and usefulness of any particular corrosion inhibitor is dependent on the circumstances in which it is applied. Thus, efficacy or usefulness under one set of circumstances often does not imply the same for another set of circumstances. As a result, a large number of corrosion inhibitors have been developed and are in use for application to various systems depending on the medium treated, the type of surface that is susceptible to the corrosion, the type of corrosion encountered, and the conditions to which the medium is exposed. For example, U.S. Pat. No. 3,909,447 describes certain corrosion inhibitors as useful against corrosion in relatively low temperature oxygenated aqueous systems such as water floods, cooling towers, drilling muds, air drilling and auto radiator systems. That patent also notes that many corrosion inhibitors capable of performing in non-aqueous systems and/or non-oxygenated systems perform poorly in aqueous and/or oxygenated systems. The reverse is true as well. The mere fact that an inhibitor that has shown efficacy in oxygenated aqueous systems does not suggest that it would show efficacy in a hydrocarbon. Moreover, the mere fact that an inhibitor has been efficacious at relatively low temperatures does not indicate that it would be efficacious at elevated temperatures. In fact, it is common for inhibitors that are very effective at relatively low temperatures to become ineffective at temperatures such as the 175° C. to 400° C. encountered in oil refining. At such temperatures, corrosion is notoriously troublesome and difficult to alleviate. Thus, U.S. Pat. No. 3,909,447 contains no teaching or suggestion that it would be effective in non-aqueous systems such as hydrocarbon fluids, especially hot hydrocarbon fluids. Nor is there any indication in U.S. Pat. No. 3,909,447 that the compounds disclosed therein would be effective against naphthenic acid corrosion under such conditions.

Atmospheric and vacuum distillation systems are subject to naphthenic acid corrosion when processing certain crude oils. Currently used treatments are thermally reactive at use temperatures. In the case of phosphorus-based inhibitors, this is thought to lead to a metal phosphate surface film. The film is more resistant to naphthenic acid corrosion than the base steel. These inhibitors are relatively volatile and exhibit fairly narrow distillation ranges. They are fed into a column above or below the point of corrosion depending on the temperature range. Polysulfide inhibitors decompose into complex mixtures of higher and lower polysulfides and, perhaps, elemental sulfur and mercaptans. Thus, the volatility and protection offered is not predictable.

The problems caused by naphthenic acid corrosion in refineries and the prior art solutions to those problems have been described at length in the literature, the following of which are representative:

U.S. Pat. No. 3,531,394 to Koszman described the use of phosphorus and/or bismuth compounds in the cracking zone of petroleum steam furnaces to inhibit coke formation on the furnace tube walls.

U.S. Pat. No. 4,024,049 to Shell et al disclosed compounds for use as refinery antifoulants. While effective as antifoulant materials, materials of this type have not heretofore been used as corrosion inhibitors in the manner set forth herein. While this reference teaches the addition of thiophosphate esters such as those used in the subject invention to the incoming feed, due to the non-volatile nature of the ester materials they do not distill into the column to protect the column, the pump-around piping, or further process steps.

U.S. Pat. No. 4,105,540 to Weinland described phosphorus containing compounds as antifoulant additives in ethylene cracking furnaces. The phosphorus compounds employed are mono- and di-esters of phosphate and phosphite compounds having at least one hydrogen moiety complexed with an amine.

U.S. Pat. No. 4,443,609 disclosed certain tetrahydrothiazole phosphonic acids and esters as being useful as acid corrosion inhibitors. Such inhibitors can be prepared by reacting certain 2,5-dihydrothiazoles with a dialkyl phosphite. While these tetrahydrothiazole phosphonic acids or esters have good corrosion and inhibition properties, they tend to break down during high temperature applications thereof with possible emission of obnoxious and toxic substances.

It is also known that phosphorus-containing compounds impair the function of various catalysts used to treat crude oil, e.g., in fixed-bed hydrotreaters and hydrocracking units. Crude oil processors are often in a quandary since if the phosphite stabilizer is not used, then iron can accumulate in the hydrocarbon up to 10 to 20 ppm and impair the catalyst. Although nonphosphorus-containing inhibitors are commercially available, they are generally less effective than the phosphorus-containing compounds.

U.S. Pat. No. 4,542,253 to Kaplan et al, described a method of reducing fouling and corrosion in ethylene cracking furnaces using petroleum feedstocks including at least 10 ppm of a water soluble amine complexed phosphate, phosphite, thiophosphate or thiophosphite ester compound, wherein the amine has a partition coefficient greater than 1.0 (equal solubility in both aqueous and hydrocarbon solvents).

U.S. Pat. No. 4,842,716 to Kaplan et al described a method for reducing fouling and corrosion by using at least 10 ppm of a combination of a phosphorus antifoulant compound and a filming inhibitor. The phosphorus compound is a phosphate, phosphite, thiophosphate or thiophosphite ester compound. The filming inhibitor is an imidazoline compound.

U.S. Pat. No. 4,941,994 Zetmeisl et al disclosed a naphthenic acid corrosion inhibitor comprising a dialkyl or trialkylphosphite in combination with an optional thiazoline.

U.S. Pat. No. 4,941,994 disclosed that metal corrosion in hot acidic liquid hydrocarbons is inhibited by the presence of a corrosion inhibiting amount of a dialkyl and/or trialkyl phosphite with an optional thiazoline. Nevertheless, there is always a desire to enhance the ability of corrosion inhibitors while reducing the amount of phosphorus-containing compounds which may impair the function of various catalysts used to treat crude oil, as well as a desire for such inhibitors that may be produced from lower cost or more available starting materials.

Another approach to the prevention of naphthenic acid corrosion is the use of a chemical agent to form a barrier between the crude and the equipment of the hydrocarbon processing unit. This barrier or film prevents corrosive agents from reaching the metal surface, and is generally a hydrophobic material. Gustaysen et al., in NACE Corrosion 89 meeting, paper no. 449, Apr. 17-21, 1989 detail the requirements for a good filming agent. U.S. Pat. No. 5,252,254 discloses one such film forming agent, sulfonated alkyl-substituted phenol, and claims effective protecting against naphthenic acid corrosion.

U.S. Pat. No. 5,182,013 issued to Petersen et al. on Jan. 26, 1993 described another method of inhibiting naphthenic acid corrosion of crude oil, comprising introducing into the oil an effective amount of an organic polysulfide. This is another example of a corrosion-inhibiting sulfur species. Sulfidation as a source of corrosion was detailed above. Though the process is not well understood, it has been determined that while sulfur can be an effective anti-corrosive agent in small quantities, at sufficiently high concentrations, it becomes a corrosion causing agent.

Organic polysulfides (Babaian-Kibala, U.S. Pat. No. 5,552,085), organic phosphites (Zetlmeisl, U.S. Pat. No. 4,941,994), and phosphate/phosphite esters (Babaian-Kibala, U.S. Pat. No. 5,630,964), have been claimed to be effective in hydrocarbon-rich phase against naphthenic acid corrosion. However, their high oil solubility incurs the risk of distillate side stream contamination by phosphorus compounds. It can be seen from U.S. Pat. No. 5,630,964 that untreated phosphate esters are not effective in corrosion-inhibition, (as can be seen from Tables 1 and 2 of said patent). In this patent, effective corrosion-inhibition is achieved by a compound which is a combination of polysulphide and untreated phosphate ester.

Phosphoric acid has been used primarily in aqueous phase for the formation of a phosphate/iron complex film on steel surfaces for corrosion inhibition or other applications (Coslett, British patent 8,667, U.S. Pat. Nos. 3,132,975, 3,460,989 and 1,872,091). Use of phosphoric acid in high temperature non-aqueous environments (petroleum) has also been reported for purposes of fouling mitigation (U.S. Pat. No. 3,145,886).

There remains a continuing need to develop innovative options for mitigating the corrosivity of acidic crudes at lower cost. This is especially true at times of low refining margins and a high availability of corrosive crudes from sources such as Europe, China, Africa, and India. The present invention addresses this need.

In view of above, there is a need to provide alternative additive composition which is non-fouling and less acidic to provide effective high temperature naphthenic acid corrosion inhibition, which will overcome the disadvantages of the prior art compositions.

SUMMARY

The present invention provides an effective novel non-polymeric and non-fouling additive for inhibiting high-temperature naphthenic acid corrosion, comprising an effective corrosion-inhibiting amount of a second phosphate ester wherein said second phosphate ester is obtained by reacting a first phosphate ester with an oxirane compound selected from the group consisting of butylene oxide, ethylene oxide, propylene oxide or any other oxirane compound or a combination thereof, preferably with butylene oxide, capably yielding said second phosphate ester, having a structure A or B,

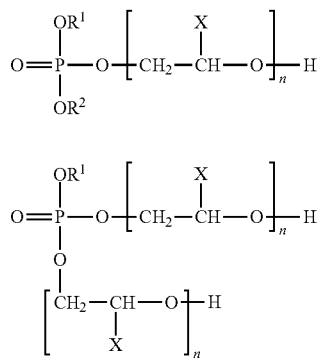

wherein $R^1$ and $R^2$ are each independently selected from the group consisting of moieties having 1 to 20 carbon atoms and $R^1$ and $R^2$ may be identical to or different from each other, X is H, $CH_3$ or $C_2H_5$; and n may vary from 1 to 20, wherein said first phosphate ester is having a structure I or II,

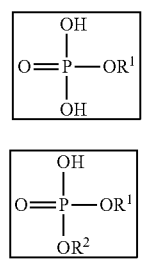

wherein $R^1$ and $R^2$ are each independently selected from the group consisting of moieties having 1 to 20 carbon atoms and $R^1$ and $R^2$ may be identical to or different from each other, said first phosphate ester being obtained as a reaction product of reaction of an alcohol with a phosphorous pentaoxide.

DESCRIPTION OF THE INVENTION

The present invention uses the following reacted compound to be used as corrosion inhibitor for inhibiting high temperature naphthenic acid corrosion. This reacted compound is obtained by reaction of alcohol with phosphorous pentoxide followed by reaction with oxirane compounds selected from the group consisting of butylene oxides ethylene oxides and propylene oxides and other such compounds.

The mole ratio of $P_2O_5$ to alcohol is preferably 1 mole of $P_2O_5$ to 1 to 10 mole of alcohol and preferably 1 mole of $P_2O_5$ to 1 to 7 mole of alcohol.

It has been surprisingly discovered by the inventor of the present invention, that a phosphate ester, reacted by oxirane compounds such as butylene oxide are having lower phosphorus content, low acidity and, and non-fouling nature and gives very effective and improved control of naphthenic acid corrosion, as compared with use of only non-treated phosphate ester.

The novel additive is made in two basic steps.
1. Alcohol is reacted with phosphorus pentoxide. (The resulting reaction compound is a commercially used prior art additive used in inhibition of naphthenic acid corrosion). The reaction can be carried out by using various mole ratios of alcohol and phosphorus pentoxide. The resultant reaction compound is a phosphate ester. This reaction compound is highly acidic in nature.
2. The resultant reaction-compound, of step 1 is further reacted with oxirane compounds like butylene oxide. Alternatively, the other common oxides like ethylene oxide or propylene oxide or any other oxirane compound also can be used. The resultant reaction compound obtained after this step no. 2 is butylene-oxide-treated phosphate ester.

It should be noted that during synthesis of phosphate esters, wherein alcohol and phosphorous pentaoxide are used, the resulting compound contains a mixture of mono-, di-, and tri-phosphate and many other phosphorous compounds are formed. Typical structures I & II, respectively, of mono- and di-phosphate ester are shown below.

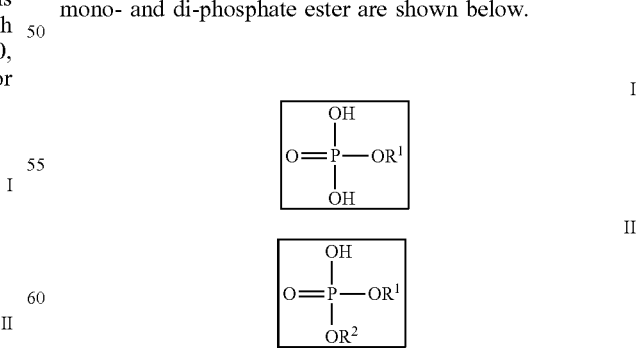

wherein $R^1$ and $R^2$ are each independently selected from the group consisting of moieties having 1 to 20 carbon atoms and $R^1$ and $R^2$ may be identical to or different from each other.

This mixture predominantly contains mono- and di-phosphates and other phosphorous compounds which are acidic in nature and expected to take part in reaction with the oxirane compounds like butylene oxide, ethylene oxide and propylene oxide capably yielding phosphate ester. Typical structures A or B, respectively, of mono- and di-phosphate ester reacted with oxides are shown below

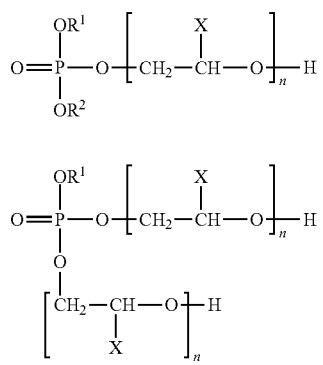

wherein $R^1$ and $R^2$ are each independently selected from the group consisting of moieties having 1 to 20 carbon atoms and $R^1$ and $R^2$ may be identical to or different from each other, X is H, $CH_3$ or $C_2H_5$; and n may vary from 1 to 20.

It should be noted that the above mentioned steps can be understood better by referring to the corresponding examples.

The present invention is directed to a method for inhibiting corrosion on the metal surfaces of the processing units which process hydrocarbons such as crude oil and its fractions containing naphthenic acid. The invention is explained in details in its simplest form wherein the following method steps are carried out, when it is used to process crude oil in process units such as distillation unit. Similar steps can be used in different processing units such as, pump-around piping, heat exchangers and such other processing units.

These method steps are explained below:
a) heating the hydrocarbon containing naphthenic acid to vaporize a portion of the hydrocarbon:
b) allowing the hydrocarbon vapors to rise in a distillation column;
c) condensing a portion of the hydrocarbon vapours passing through the distillation column to produce a distillate;
d) adding to the distillate, from 1 to 2000 ppm of, for example, butylene-oxide-treated phosphate ester, which is the required additive of present invention;
e) allowing the distillate containing additive compound of step (d) to contact substantially the entire metal surfaces of the distillation unit to form protective film on such surface, whereby such surface is inhibited against corrosion.

It is advantageous to treat distillation column, trays, pump-around piping and related equipment to prevent naphthenic acid corrosion, when condensed vapours from distilled hydrocarbon fluids contact metallic equipment at temperatures greater than 200° C., and preferably 400° C. The additive is generally added to the condensed distillate and the condensed distillate is allowed to contact the metallic surfaces of the distillation column, packing, trays, pump around piping and related equipment as the condensed distillate passes down the column and into the distillation vessel. The distillate may also be collected as product. The corrosion inhibitors of the instant invention remain in the resultant collected product.

In commercial practice, the additives of this invention may be added to a distillate return to control corrosion in a draw tray and in the column packing while a second injection may be added to a spray oil return immediately below the draw trays to protect the tower packing and trays below the distillation draw tray. It is not so critical where the additive of the invention is added as long as it is added to distillate that is later returned to the distillation vessel, or which contact the metal interior surfaces of the distillation column, trays, pump around piping and related equipments.

EXAMPLES

The method of using the additive of the present invention for achieving inhibition of high temperature naphthenic acid corrosion is explained below with the help of examples and tables.

Example 1

Into a clean four-necked round bottom flask, kept in an oil bath at 30° C., 733.4 gm of 2-ethyl-hexanol was charged, and nitrogen gas purging was started. Total amount of 266.5 gm of phosphorous pentoxide was added to the flask in six installments. Exotherm was observed after addition of phosphorous pentoxide to the flask. After addition of phosphorous pentoxide was completed, the temperature of reaction mixture was raised to 99° C. and this temperature was maintained for four hours.

The reaction mixture was cooled to 30° C.-35° C., filtered and analyzed for acid value and phosphorous content by method of Inductive Coupled Plasma (ICP).

The acid value was found to be in the range of 280 to 330 mg KOH/gm. Typical acid value was 308 mg KOH/gm. The phosphorous content was in the range of 10 to 12%. Typical value of phosphorous content was 11.65%. The resulting reaction mixture of Example 1 is prior art's additive for Naphthenic Acid Corrosion Inhibition. The results of experiments of Example 1 are given in Table 1.

Example 2

Into a clean four-necked round bottom flask, kept in an oil bath at 30° C., 200 gm of reaction mixture of Example 1 was charged. Into this reaction mixture 150 gm of butylene oxide was slowly added. The exotherm was observed and the temperature was maintained below 40° C. till the addition of entire quantity of 150 gm of butylene oxide was completed. The samples of resulting chemical mixture were taken intermittently and were analyzed for acid value. The reaction was continued till the acid value was 10 mg KOH/gm.

The resulting reaction mixture was then heated to 60° C. temperature, and was maintained at this temperature for two hours.

The resulting reaction mixture was cooled to 30° C.-35° C., filtered and analyzed for acid value and phosphorous content, by method of ICP.

The acid value was found to be less than 10 mg KOH/gm. Typical acid value was 1 mg KOH/gm. The phosphorous content was in the range of 5 to 7%. Typical phosphorous content value was 6.53%. The resulting reaction mixture of Example 2 is used as Invention-Additive for Naphthenic Acid Corrosion Inhibition. The results of experiments of Example 2 are given in Table 1.

Example 3

Into a clean four-necked round bottom flask, kept in a water bath at 30° C., 486 gm of 2-ethyl-hexanol was charged, and nitrogen gas purging was started. Total amount of 265 gm of phosphorous pentoxide was added to the flask in six installments. Exotherm was observed after addition of phosphorous pentoxide to the flask. After addition of phosphorous pentoxide was completed, the temperature of reaction mixture was raised to 99° C. and this temperature was maintained for four hours.

The reaction mixture was cooled to room temperature of 30° C., filtered and analyzed for acid value and phosphorous content by method of ICP.

The acid value was found to be in the range of 320 to 350 mg KOH/gm. Typical acid value was 331 mg KOH/gm. The phosphorous content was in the range of 14 to 16%. Typical value of phosphorous content was 15.408%. The resulting reaction mixture of Example 3 is prior art's additive for Naphthenic Acid Corrosion Inhibition. The results of experiments of Example 3 are given in Table 1.

Example 4

Into a clean four-necked round bottom flask, kept in a water bath at 30° C., 100 gm of reaction mixture of Example 3 was charged. Into this reaction mixture 88 gm of butylene oxide was slowly added. The exotherm was observed and the temperature was maintained below 40° C. till the addition of entire quantity of 88 gm of butylene oxide was completed. The samples of resulting chemical mixture were taken intermittently and were analyzed for acid value. The reaction was continued till the acid value was 10 mg KOH/gm.

The resulting reaction mixture was then heated to 60° C. temperature, and was maintained at this temperature for two hours.

The resulting reaction mixture was cooled to room temperature of 30° C., filtered and analyzed for acid value and phosphorous content, by ICP.

The acid value was found to be less than 10 mg KOH/gm. Typical acid value was 6.8 mg KOH/gm. The phosphorous content was in the range of 7 to 9%. Typical phosphorous content value was 8.19%. The resulting reaction mixture of Example 4 is used as Invention-Additive for Naphthenic Acid Corrosion Inhibition. The results of experiments of Example 4 are given in Table 1.

Example 5

High Temperature Naphthenic Acid Corrosion Test

In this example, various amounts of additives prepared in accordance, with Examples 1 to 4, were tested for corrosion inhibition efficiency on steel coupons in a hot oil containing naphthenic acid. A weight loss coupon, immersion test was used to evaluate the invention compound for its effectiveness in inhibition of naphthenic acid corrosion at 290° C. temperature. Different dosages of invention additive compounds are used as shown in Table 1.

A static test on steel coupon was conducted without using any additive. This test provided a blank test reading.

The reaction apparatus consisted of a one-litre four-necked round bottom flask equipped with water condenser, $N_2$ purger tube, thermometer pocket with thermometer and stirrer rod. 600 gm (about 750 ml) paraffin hydrocarbon oil (D-130) with fractions boiling above 290° C., was taken in the flask. $N_2$ gas purging was started with flow rate of 100 cc/minute and the temperature was raised to 100° C., which temperature was maintained for 30 minutes.

In different experiments, additive compounds of Examples 1 to 4 were used for testing their effectiveness in Naphthenic Acid Corrosion Inhibition. The reaction mixture after addition of additive compound was stirred for 15 minutes at 100° C. temperature. After removing the stirrer, the temperature of the reaction mixture was raised to 290° C. A pre-weighed weight-loss carbon steel coupon CS 1010 with dimensions 76 mm×13 mm×1.6 mm was immersed. After maintaining this condition for 1 hour to 1.5 hours, 31 gm of naphthenic acid (commercial grade with acid value of 230 mg KOH/gm) was added to the reaction mixture. A sample of one gm weight of reaction mixture was collected for determination of acid value, which was found to be approximately 11.7. This condition was maintained for four hours. After this procedure, the metal coupon was removed, excess oil was rinsed away, and the excess corrosion product was removed from the metal surface. Then the metal coupon was weighed and the corrosion rate was calculated in mils per year.

Calculation of Corrosion Inhibition Efficiency

The method used in calculating Corrosion Inhibition Efficiency is given below. In this calculation, corrosion inhibition efficiency provided by additive compound is calculated by comparing weight loss due to additive with weight loss of blank coupon (without any additive).

$$\text{Corrosion Inhibition Efficiency} = \frac{(\text{Weight loss for blank without additive}) - (\text{weight loss with additive})}{(\text{weight loss for blank without additive})} \times 100$$

The calculated magnitudes are entered in the Table 1 in appropriate columns.

Example 6

High Temperature Naphthenic Acid Corrosion Dynamic Test

The dynamic testing was carried out by using rotating means provided in the temperature-controlled autoclave and was carried out by using steel coupons. A weight-loss coupon immersion dynamic test was used to evaluate the invention compound for its effectiveness in inhibition of naphthenic acid corrosion at 260° C. temperature under dynamic condition. In this example, various amounts of an about 50% or neat additive prepared in accordance with Examples 1 to 4 were tested. A dynamic test on steel coupon was conducted without using any additive. This test provided a blank test reading.

The following test equipment and materials were used in the Dynamic Corrosion Test:
1. Temperature controlled autoclave
2. Pre-weighed weight-loss carbon steel coupons CS 1010 with dimensions 76 mm×13 mm×1.6 mm.
3. Means to rotate the coupon.

Material:
1. Naphthenic acid was externally added to provide an acid neutralization number of approximately 12 mg/KOH/gm.

2. Nitrogen gas in the vapour space.

Two pre-weighed carbon steel coupons, were clamped to the rotating means of the autoclave. The dynamic test was conducted at about 260° C. for about 6 hours. After the test, the coupons were removed, excess oil was rinsed away, excess corrosion product was removed from the surface of coupons. The coupons were then weighed and the corrosion rate was calculated as mils/year. The results of this dynamic test are presented in Table 2.

TABLE 1

| Resulting Reaction Product from Example | Typical Phosphorous Content % | Additive Total Dosage (ppm) | Additive Active Dosage (ppm) | Weight Loss in mg | MPY | % Efficiency |
|---|---|---|---|---|---|---|
| Example 1 (Prior art) | 11.65 | 100 | 100 | 10.9 | 55 | 86.4 |
|  |  | 50 | 50 | 42.3 | 212 | 47.4 |
| Example 2 (Invention Additive) | 6.53 | 75 | 75 | 3.4 | 17 | 95.8 |
|  |  | 50 | 50 | 13.8 | 69 | 82.8 |
| Example 3 (Prior Art) | 15.408 | 100 | 100 | 7.1 | 36 | 91.2 |
|  |  | 50 | 50 | 39.9 | 200 | 50.4 |
| Example 4 (Invention Additive) | 8.19 | 50 | 50 | 5.9 | 30 | 92.7 |
|  |  | 25 | 25 | 25.2 | 126 | 68.7 |
| Blank | 0 | 0 | 0 | 80.4 | 402 | NA |

TABLE 2

| AUTOCLAVE TEST (Example 6) | | | | | | | |
|---|---|---|---|---|---|---|---|
| Product | Additive Total Dosage (ppm) | Additive Active Dosage ppm | Typical Phosphorous content (%) | Active Phosphorous, ppm* | Mg loss after test | MPY after test | % efficiency after test |
| Blank | — | — | — | — | 43.1 | 143.8 | — |
| Example 1 | 500 | 500 | 11.65 | 58.25 | 9.3 | 31.0 | 76.1 |
| Example 2 | 500 | 500 | 6.53 | 32.65 | 3.1 | 10.34 | 92.8 |
| Example 3 | 500 | 500 | 15.40 | 77.04 | 7.25 | 24.2 | 83.2 |
| Example 4 | 500 | 500 | 8.19 | 40.95 | 1.4 | 4.7 | 96.7 |
| Example 4 | 250 | 250 | 8.19 | 20.48 | 3.67 | 12.24 | 91.5 |
| Tributyl Phosphate | 500 | 500 | 11.6 | 58.0 | 38.05 | 127 | 11.7 |
| Tris 2 Ethyl Hexyl Phosphate | 500 | 500 | 7.0 | 35 | 40.89 | 136.4 | 5.10 |

*The column indicates active phosphorous in the system

Example 7

Fouling Tendency Of Corrosion Inhibiting Additives

The fouling tendency of each of invention additives and prior art additives was determined by heating 1% solution of each additive in the oil at 290° C. for two hours. The observations with respect to precipitate-formation are given in Table 3.

TABLE 3

| Additive | Observation with respect to precipitate - formation |
|---|---|
| Example 1 | Heavy precipitation |
| Example 2 | Slight solids - formation |
| Example 3 | Heavy precipitation |
| Example 4 | Slight solids - formation |
| Tributyl Phosphate | Completely hazy solution |

Detailed Discussion about Experimental Results

The detailed discussion given below, with respect to the experimental results, presented in Tables 1 to 3, for different experiments described in Examples 1 to 6, explains the high effectiveness of the invention additive compound of present invention, in high temperature naphthenic acid corrosion inhibition. The inventor of the present invention has surprisingly found that, even with reduction in amount of dosages used of the active components of invention additive compound as compared with the amount of dosages of prior art additive compounds, high effectiveness in corrosion inhibition is obtained.

Detailed Discussion of Experimental Results Given in Table 1

It is seen that in Examples 1 and 3, wherein prior art additive compounds were used, with active dosage amounts of 100 ppm of additive compound, in each case, having typical phosphorous content percentage of 11.65 and 15.408, respectively and the percent efficiency of corrosion-inhibition was respectively 86.4 and 91.2. In the same examples, by reducing the active dosage amounts to 50 ppm of additive compound in each case with same percentages of phosphorous contents mentioned above, the corresponding percentage efficiency of corrosion inhibition, dropped down respectively to 47.4 and 50.4.

While comparing the above mentioned results about effectiveness of prior art additives, it is seen in Examples 2 and 4, wherein invention additive compounds are used for naphthenic acid corrosion inhibition, that higher corrosion inhibition efficiencies are obtained by using lower dosage amounts, also providing lesser percentages of phosphorous contents, as shown below.

In Example 2, along with providing lesser percent phosphorous content of 6.53, in each case, use of active dosage amounts of invention additive compound of 75 ppm and 50 ppm, the corresponding percentage efficiencies of common inhibition were respectively 95.8 and 85.8.

In Example 4, along with providing a little higher percent phosphorous content of 8.19, in each case, with use of even reduced active dosage amounts of invention additive compound of 50 ppm and 25 ppm, the corresponding percent efficiencies of corrosion inhibition were respectively 92.7 and 68.7 respectively.

Detailed Discussion of Experimental Results Given in Table 2

It is seen that by using procedures of Examples 1 and 3, wherein prior art additive compounds were used with active dosage amounts of 500 ppm of additive compound, in each case, the typical phosphorous content percentage was respectively 11.65 and 15.408, and the percent efficiency of corrosion-inhibition was respectively 76.1 and 83.2.

It is also seen that, by using prior art additive compound of tributyl phosphate, with active dosage amount of 500 ppm, with typical phosphorous content of 11.6%, the percent efficiency of corrosion inhibition was only 11.7%.

Similarly, it is seen that, by using prior art additive compound of Tris 2 ethyl hexyl phosphate, with active dosage amount of 500 ppm with typical phosphorous content of 7%, the percent efficiency of common inhibition was only 5.1%.

While comparing the above mentioned results about effectiveness of prior art additives it is seen by using procedures of Examples 2 and 4, wherein invention additive compounds were used for naphthenic acid corrosion inhibition, that higher corrosion inhibition efficiencies of 92.8% and 96.7% respectively were obtained by using same active dosage amounts of 500 ppm in each case, along with percentages of typical phosphorous contents, of 6.53% and 8.19% respectively.

By using procedure of Example 4 along with providing a percent of typical phosphorous content of 8.19, with use of even reduced active dosage amount of 250 ppm of invention additive compound, the corresponding percent efficiency of corrosion inhibition was 91.5%.

Detailed Discussion of Experimental Results Given in Table 3

Referring to Table 3, it is clearly seen from results of Examples 2 and 4, that use of invention additive compounds led to very slight solid-formation, whereas in case of Examples 1 and 3, use of prior art additive compounds additive compounds led to heavy precipitation, which could lead to heavy fouling of equipments. Similarly use of prior art additive of tributyl phosphate also led to completely hazy solution.

All of these details discussed above clearly point out to the fact that, as compared to additive compounds of prior art, the invention additive compound of the present invention provides better efficiency of corrosion inhibition along with lower percent phosphorous content (and hence lower acidic value) and lower dosages of active invention additive compound (thereby making it more economical). The invention additive compound is also non-fouling as it leads to very slight solids-formation.

Discussion of Distinguishing Features of Present Invention

Thus, it is seen that the additive compound of present invention used for corrosion-inhibition has the following important distinguishing features, as compared to the prior art.

1) The inventor of the present invention, after extensive experimentation, has surprisingly found that the additive compound used by the inventor, is highly effective in high temperature corrosion inhibition, as shown by the experimental results given in Tables 1 and 2.

2) Another distinguishing feature of the additive compound of present invention is that, it has very low acidity as compared to the additive compounds of prior art, for example, the phosphate esters of prior art has very high acidity. The phosphate esters of prior art are known to have a tendency to decompose, even at lower temperatures, to form phosphoric acids, which travel further along the hydrocarbon stream and react with metal surfaces of equipments such as packing of distillation column, to form solid iron phosphate. These solids plug the holes of equipments and thereby lead to fouling of distillation column (refer to Table 3).

The additive compound of the present invention does not have this deficiency.

3) The invention compound is very effective in corrosion-inhibition, even when used in much lower dosage amounts, as compared to the prior art compounds.

4) The corrosion-inhibition-efficiency is achieved by present invention-additive, at low-phosphorous-concentrations (as compared to prior art additives). This is very advantageous because the phosphorous is poisonous for the performance of catalysts used in further downstream units.

5) The invention compound has extremely low potential for fouling as explained in the Table 3.

6) The invention-additive is shown to perform much better by giving higher efficiencies as compared to other prior art additives like trialkyl phosphates such as tributyl phosphate, tris 2 ethyl hexyl phosphate.

7) The invention compound is a low-cost corrosion-inhibiting-additive, as compared to prior art additive.

It may be noted that effectiveness of present invention inhibitors has been checked for crude oil containing naphthenic acid, but these are suitable for crude oil containing naphthenic acid and sulfur compounds.

In view of the above, it is understood that, the present invention comprises of the following items:

Item 1: An effective novel non-polymeric and non-fouling additive for inhibiting high-temperature naphthenic acid corrosion, comprising an effective corrosion-inhibiting amount of a second phosphate ester wherein said second phosphate ester is obtained by reacting a first phosphate ester with an oxirane compound selected from the group consisting of butylene oxide, ethylene oxide, propylene oxide or any other oxirane compound or a combination thereof, preferably with butylene oxide, capably yielding said second phosphate ester, having a structure A or B,

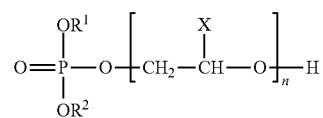

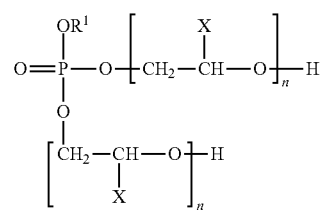

wherein $R^1$ and $R^2$ are each independently selected from the group consisting of moieties having 1 to 20 carbon atoms and $R^1$ and $R^2$ may be identical to or different from each other, X is H, $CH_3$ or $C_2H_5$; and n may vary from 1 to 20, wherein said first phosphate ester is having a structure I or II,

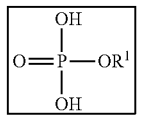

I

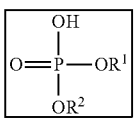

II wherein R$^1$ and R$^2$ are each independently selected from the group consisting of moieties having 1 to 20 carbon atoms and R$^1$ and R$^2$ may be identical to or different from each other, said first phosphate ester being obtained as a reaction product of reaction of an alcohol with a phosphorous pentaoxide.

Item 2: An effective additive, as described in item 1, wherein said effective additive has acidity varying from about 1 mg KOH/gm to about 20 mg KOH/gm as determined by titration of samples against normal alcoholic KOH.

Item 3: An effective additive, as described in item 1, wherein said effective additive has phosphorus contents varying from about 0.5% to about 9% of said effective additive.

Item 4: An effective additive, as described in item 1, wherein mole ratios of said phosphorus pentoxide and said alcohol are used, such that the mole ratio of said phosphorus pentoxide to said alcohol is preferably 1 mole of said phosphorus pentoxide to 1 to 10 mole of said alcohol and preferably 1 mole of said phosphorus pentoxide to 1 to 7 mole of said alcohol.

Item 5: An effective additive as described in item 1, wherein active dosage of said additive is 1 to 2000 ppm.

Item 6: A process of high temperature naphthenic acid corrosion inhibition of metallic surfaces of any of the hydrocarbon processing units of a petrochemical plant, used for processing a stream containing naphthenic acid, with said processing units comprising distillation columns, strippers, trays, pump around piping and related equipments, and said process using said second phosphate ester of item 1, comprising the steps of:
a. heating said hydrocarbon containing naphthenic acid to vapourize a portion of said hydrocarbon;
b. condensing a portion of the hydrocarbon vapors, passing through said hydrocarbon processing unit, to produce a condensed distillate;
c. adding to said distillate, before said condensed distillate is returned to said hydrocarbon processing unit or collected as a product, from 1 to 2000 ppm of said second phosphate ester of item 1 in corrosion-inhibition-effective-amount, capably forming a reaction mixture;
d. allowing said reaction mixture to contact said metallic surfaces of said hydrocarbon processing unit to form a protective film on said surfaces whereby each of said surfaces is inhibited against corrosion; and
e. allowing said condensed distillate to return to said hydrocarbon processing unit, or to be collected as said product.

Item 7: A process as described in item 1, wherein said stream includes crude oil, feedstock, and hydrocarbon stream and/or fractions thereof.

The present invention has been described with reference to foregoing examples. It is obvious for the person skilled in the art to modify these without deviating from its scope, which are intended to be included within its scope.

What is claimed is:

1. A process for inhibiting high temperature naphthenic acid corrosion of a metallic surface of a hydrocarbon processing unit of a petrochemical plant, used for processing a stream containing naphthenic acid, with said processing units comprising distillation columns, strippers, trays, pump around piping and related equipments, and wherein the process comprises the steps of:

(a) heating said hydrocarbon containing naphthenic acid to vapourize a portion of said hydrocarbon;

(b) condensing a portion of the hydrocarbon vapors, passing through said hydrocarbon processing unit, to produce a condensed distillate;

(c) adding to said condensed distillate, before said condensed distillate is returned to said hydrocarbon processing unit or collected as a product, from 1 to 2000 ppm of a non-polymeric and non-fouling additive for inhibiting high-temperature naphthenic acid corrosion in a corrosion-inhibition-effective-amount to form a reaction mixture;

(d) allowing said reaction mixture to contact said metallic surface of said hydrocarbon processing unit to form a protective film on said metallic surface whereby said metallic surface is inhibited against corrosion; and (e) allowing said condensed distillate to return to said hydrocarbon processing unit, or to be collected as said product, wherein said non-polymeric and non-fouling additive comprises oxide treated phosphate ester, wherein the oxide treated phosphate ester is a reaction product of a phosphate ester and an oxirane compound selected from the group consisting of butylene oxide, ethylene oxide, propylene oxide or any other oxirane compound or a combination thereof, and comprises a mixture of compounds having structural formulae A and B:

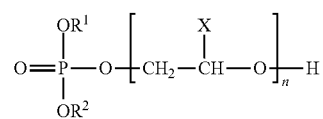

(A)

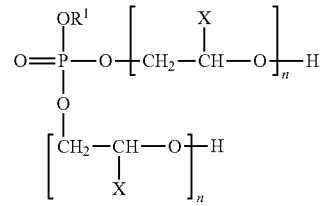

(B)

wherein R$^1$ and R$^2$ are each independently selected from the group consisting of moieties having 1 to 20 carbon atoms, and R$^1$ and R$^2$ may be identical to or different from each other, X is H, CH$_3$ or C$_2$H$_5$; and n may vary from 1 to 20, wherein said phosphate ester at least comprises a mixture of compounds of structural formulae I and II:

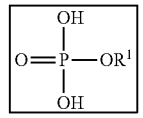

I

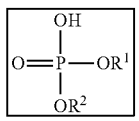

II wherein $R^1$ and $R^2$ are each independently selected from the group consisting of moieties having 1 to 20 carbon atoms, and $R^1$ and $R^2$ may be identical to or different from each other,
wherein said phosphate ester is a reaction mixture of reacting an alcohol with a phosphorous pentaoxide.

2. The process as claimed in claim 1, wherein said stream includes crude oil, feedstock, and hydrocarbon stream and/or fractions thereof.

3. The process as claimed in claim 1, wherein the additive has acidity varying from about 1 mg KOH/gm to about 20 mg KOH/gm.

4. The process as claimed in claim 1, wherein the additive has phosphorus contents varying from about 0.5% to about 9% of said additive.

5. The process as claimed in claim 1, wherein mole ratios of said phosphorus pentoxide and said alcohol are used, such that the mole ratio of said phosphorus pentoxide to said alcohol is 1 mole of said phosphorus pentoxide to 1 to 10 mole of said alcohol and 1 mole of said phosphorus pentoxide to 1 to 7 mole of said alcohol.

6. A method comprising:
using a non-polymeric and non-fouling additive for inhibiting high temperature naphthenic acid corrosion of metallic surface of a hydrocarbon processing unit of a petrochemical plant, used for processing a stream containing naphthenic acid, with said processing units comprising distillation columns, strippers, trays, pump around piping and related equipments, wherein the non-polymeric and non-fouling additive is added to said processing units and comprises oxide treated phosphate ester, wherein the oxide treated phosphate ester is a reaction product of a phosphate ester and an oxirane compound selected from the group consisting of butylene oxide, ethylene oxide, propylene oxide or any other oxirane compound or a combination thereof, and comprises a mixture of compounds having structural formulae A and B:

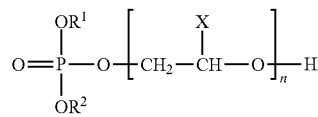

(A)

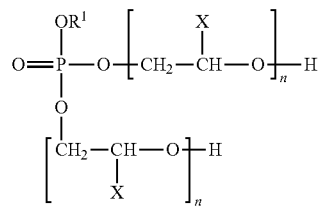

(B)

wherein $R^1$ and $R^2$ are each independently selected from the group consisting of moieties having 1 to 20 carbon atoms, and $R^1$ and $R^2$ may be identical to or different from each other, X is H, $CH_3$ or $C_2H_5$; and n may vary from 1 to 20, wherein said phosphate ester at least comprises a mixture of compounds of structural formulae I and II:

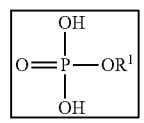

I

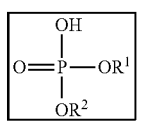

II wherein $R^1$ and $R^2$ are each independently selected from the group consisting of moieties having 1 to 20 carbon atoms, and $R^1$ and $R^2$ may be identical to or different from each other,
wherein said phosphate ester is a reaction mixture of reacting an alcohol with a phosphorous pentaoxide.

7. The method as claimed in claim 6, wherein the additive has acidity varying from about 1 mg KOH/gm to about 20 mg KOH/gm.

8. The method as claimed in claim 6, wherein the additive has phosphorus contents varying from about 0.5% to about 9% of said additive.

9. The method as claimed in claim 6, wherein mole ratios of said phosphorus pentoxide and said alcohol are used, such that the mole ratio of said phosphorus pentoxide to said alcohol is 1 mole of said phosphorus pentoxide to 1 to 10 mole of said alcohol and 1 mole of said phosphorus pentoxide to 1 to 7 mole of said alcohol.

* * * * *